Aug. 25, 1959
E. L. YOUNKER
2,901,602
BINARY HALF ADDER
Filed Nov. 19, 1953
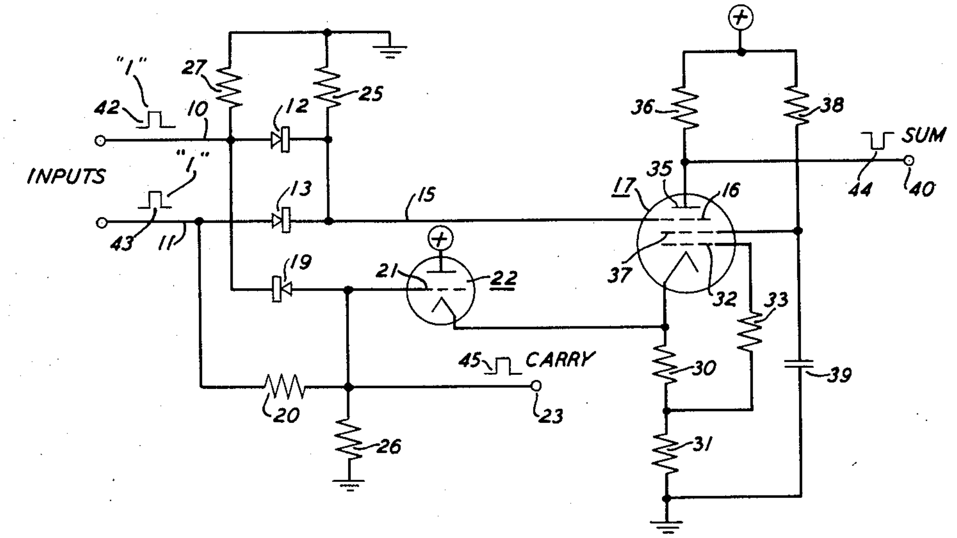
INVENTOR
E. L. YOUNKER
BY [signature]
ATTORNEY 2,901,602
Patented Aug. 25, 1959

2,901,602

BINARY HALF ADDER

Elmer L. Younker, Madison, N.J., assignor to Bell Telephone Laboratories, Incorporated, New York, N.Y., a corporation of New York Application November 19, 1953, Serial No. 393,204

8 Claims. (Cl. 250—27)

This invention relates to electrical circuits and more particularly to such circuits commonly referred to as binary half-adders.

There is an increasing interest, due in part to the development of electronic computers and related electrical systems, in circuits concerned with the logical operations that can be performed on information appearing in the form of coded pulses. A considerable number of these types of circuits have been devised and utilized in many ways, as for the translation of information between various codes and for the accomplishment of arithmetic in these codes. These circuits are built upon elemental logic components that are capable of performing certain specific operations. Unfortunately these components have not been identified in the literature with any consistency of terminology.

One of these components that has found use in logic circuits is often referred to as a binary half-adder and shall be so designated herein. The circuit generally has two inputs and two outputs. If a pulse appears only at one input, a pulse appears on one of the outputs, generally designated the "sum" output. If a pulse appears at both inputs, a pulse appears at the other output, generally designated the "carry" output. While this circuit is frequently employed for arithmetical operations, as is apparent from the terminology, it may also be utilized as a component in other types of circuits. Thus an output on the "sum" lead indicates that the two inputs are dissimilar; this has led this type of circuit to be also known as a disparity recognizer or an anticoincidence circuit. Other appellations that have been applied to it include a re-entry adder, a Not And circuit, a non-parity circuit, etc.

It is a general object of this invention to provide an improved circuit of the half-adder type.

In one specific illustrative embodiment of this invention, inputs are applied to both an "Or" and an "And" circuit. The output of the "Or" circuit is applied to the suppressor grid of a pentode tube and the output of the "And" circuit is applied, through a triode cathode follower tube, to the cathode of the pentode. As the outputs of the logic circuits are applied to a grid and the cathode of the pentode, the pentode itself acts as an "And" circuit with an inherent phase inversion so that an output pulse appears at the plate of the pentode only on the presence of an input to the suppressor grid in the absence of an input to the cathode circuit. Thus a pulse appearing at the plate of the pentode is the sum output indicating that one of two, but not both, inputs were initially applied to the circuit while a pulse on a separate lead from the "And" circuit is the carry output of the half-adder indicating that both inputs to the circuit were initially applied.

In accordance with an aspect of this invention, the positive pulse applied to the suppressor grid of the pentode is counterbalanced by a rise in potential of the cathode so that there is substantially no change in the suppressor grid-cathode voltage relation and thus no change in the voltage at the plate of the pentode or, in other words, zero sum output from the circuit when both inputs are applied to the circuit. This is attained by connecting the cathode of the cathode follower triode to the cathode of the pentode, both cathodes being biased above ground by the current flowing through two cathode resistances in series. When the triode conducts, on application of a pulse to its control grid indicating that both inputs have been applied to the circuit, the total current through the cathode resistances is increased with a concomitant rise in the potential of the cathodes. The control grid of the pentode is connected to the tap between the two cathode resistances so that the control grid potential also increases and maintains substantial current through the pentode.

Advantageously the values of the two cathode resistances and the ratio of their resistance values are so chosen that substantial current through the pentode is maintained and also so that the change in voltage of the pentode cathode due to the increased current through the cathode resistances is substantially equal to the change in voltage on the suppressor grid due to the pulses applied to it from the initial "Or" circuit.

The pentode thus allows an output to appear on application of a single input thereto, but not on application of two inputs. Further as the output pulse is delivered by the pentode, the output pulse is amplified.

It is therefore a feature of this invention that an electrical circuit include a pentode to the suppressor grid of which a positive pulse is applied on the occurrence of either of two conditions and the cathode potential of which is raised by approximately the amount of the positive pulse on the occurrence of only one of those conditions whereby the suppressor grid-cathode voltage relation remains substantially the same for that one condition and an output pulse appears on the plate of the pentode only on the occurrence of the other of the two conditions.

It is a further feature of this invention that the cathode of the pentode be connected to ground through cathode resistances and the cathode of a triode be also connected to ground through those resistances, whereby on occurrence of that one condition current flows through the triode to increase the current flow in the cathode resistances thereby increasing the cathode potential.

It is a further feature of this invention that the control grid of the pentode be connected to a tap between two cathode resistances in series so that the control grid potential is also increased as the cathode potential increases whereby substantial current through the pentode is maintained.

It is a still further feature of this invention that the total cathode resistance be of such a value that the change of cathode potential is substantially equal to the change of potential on the suppressor grid and also that the ratio of the two cathode resistances be such that the change in control grid potential with respect to the change in cathode potential due to the increased current through the cathode resistances enables substantial current through the pentode to be maintained.

These and other features of this invention may be completely understood from consideration of the following description and the accompanying drawing, the single figure of which depicts an illustrative embodiment of the invention comprising a binary half-adder circuit.

Turning now to the drawing, the specific illustrative embodiment of this invention there depicted comprises a pair of input leads 10 and 11 connected to diode elements 12 and 13, respectively, which comprise an "Or" circuit. The output lead 15 of this "Or" circuit is connected to the suppressor grid 16 of a pentode tube 17. Input lead 10 is also connected to a diode element 19 and input lead 11 to a resistor 20 which together comprise an "And" circuit, the output of which is applied both to the grid 21 of a triode 22 and to carry output terminal 23. Resistances 25 and 26 are connected to the output leads of the "Or" and "And" circuit respectively and are the resistances across which the output voltages are developed, as is known in the art. A resistance 27 is connected between lead 10 and ground because the "And" circuit includes a diode and a resistance; if the "And" circuit comprises two diodes a slightly different circuit configuration would be employed, as is known in the art. Further details of "And" and "Or" circuit designs may be had by reference to any of the standard texts on the subject such as "The Design of Switching Circuits" by Keister et al., published by the D. van Nostrand Co. Inc., N.Y. (1951), particularly pages 217–223.

The cathodes of the pentode 17 and the triode 22 are connected together and to ground or a reference potential through a pair of cathode resistances 30 and 31. The control grid 32 of the pentode is connected to point of connection between resistances 30 and 31 through a resistance 33. The plate 35 of the pentode 17 is connected through a resistance 36 to a suitable voltage supply and the screen grid 37 is also connected through a resistance 38 to that voltage supply as well as to ground through a condenser 39. The sum output terminal 40 is connected to the plate 35. The plate of the cathode follower triode 22 is also connected to a suitable voltage supply for operation of that tube.

While the various electrodes of pentode 17 have been referred to by their classic names of control, screen, and suppressor electrodes, it is apparent that this nomenclature is that of the art and is not functionally descriptive of the operation of these electrodes in this circuit, as these electrodes are merely three electrodes positioned within the tube between the cathode and the anode.

The operation of this specific illustrative embodiment of the invention as a binary half-adder can best be understood from a description of its functioning under the various input conditions. When there are no input pulses on input leads 10 and 11, pentode 17 will draw a substantial cathode current because of the connection of the control grid 32 to the tap between the cathode bias resistors 30 and 31. Nearly all of this cathode current will go to the screen grid 37, as the suppressor grid 16 is held at ground potential and is therefore quite negative with respect to the cathode. The triode 22 is practically cut off for the same reason and does not contribute appreciably to the current flowing through the cathode resistors 30 and 31.

If a positive pulse 42 or 43, representing a digit "1," is present on only one of the input leads 10 or 11, respectively, a positive pulse will appear across the resistor 25 on the output lead 15 of the "Or" circuit and thus be applied to the suppressor grid 16. This permits plate current to flow, and a negative sum output pulse 44 appears at terminal 40. No signal will appear at terminal 23 as the "And" circuit requires that both pulse 42 and 43 appear on input leads 10 and 11 and we have assumed that only one or the other of them is present.

If both pulses 42 and 43 are present on leads 10 and 11, a positive voltage will be developed across resistor 25 and be applied by lead 15 to the suppressor grid 16 of pentode 17 as before. However, a positive voltage will now be also developed across the resistor 26 and be applied to the grid 21 of the cathode follower triode 22, causing that triode to draw considerable current through the common cathode resistors 30 and 31. This will raise the voltage of the pentode cathode causing the suppressor grid-cathode voltage relation to remain about the same. Thus the effect of the application of the positive voltage on the suppressor grid 16 is negated and substantially no plate current will flow. No output pulse will therefore be present at terminal 40. However, the positive voltage developed across resistor 26 will appear as a carry output pulse 45 at terminal 23.

When the cathode follower triode 22 conducts, the actual direct current voltage of the pentode cathode should be increased by the same amount as the voltage increase on the suppressor grid 16. As pointed out above the cathode voltage increases due to an increase in current flowing through the cathode resistors 30 and 31. If the control grid 32 were at some constant potential, the tendency of the cathode potential to increase would reduce the current flowing through the pentode to zero as the pentode cut off. Due to this effect the current flowing through the cathode resistors 30 and 31 would be supplied entirely by the cathode follower. This current might not be sufficient to increase the cathode potential by the required amount. It is therefore another aspect of this invention that the control grid 32 be biased by being connected to the tap between the resistors 30 and 31 so that as the pentode cathode potential becomes more positive, the control grid potential also becomes more positive allowing substantial current flow through the pentode 17 to be maintained and the total current through the resistors 30 and 31 to increase to give the required change in cathode potential.

The choice of values of the various circuit parameters enables an almost exact equivalency of the increase of voltage on the suppressor 16 and the pentode cathode to be attained. The performance of this circuit is not dependent on an exact equivalence but will operate successfully with considerable variation therefrom. I have found it desirable, however, that the ratio of the resistance value of resistance 30 to that of resistance 31 be of the order of 1:1.5 to 1:2 best to attain the beneficial results of this invention.

In one specific illustrative circuit arrangement in accordance with the embodiment depicted in the drawing, pentode 17 was a 6AS6, triode 22 half of a double triode 396A, a voltage of 150 volts was applied to the plates of both tubes, diodes 12, 13 and 19 were point contact germanium diodes known as the W. E. type 400, capacitor 39 was 0.05 microfarad, and the various resistances had the following values:

| Resistance: | Value in ohms |
|---|---|
| **20** | 1,000 |
| **25** | 56,000 |
| **26** | 56,000 |
| **27** | 1,000 |
| **30** | 390 |
| **31** | 620 |
| **33** | 47,000 |
| **36** | 3,300 |
| **38** | 4,700 |

The above values are merely illustrative of a particular configuration in accordance with this invention and are not to be considered as limiting the scope of the invention in any way.

It is to be understood that the above described arrangements are illustrative of the application of the principles of the invention. Numerous other arrangements may be devised by those skilled in the art without departing from the spirit and scope of the invention.

What is claimed is:

1. An electrical circuit comprising a pair of input terminals, an electron discharge device having a cathode, an anode, and a first, second and third electrode positioned in that order between said cathode and said anode, a pair of cathode resistances connected between said cathode and a reference potential, means connecting said first electrode to the common point between said resistances to bias said first electrode to maintain a substantial current in said device to said second electrode, means for applying a positive voltage to said anode and said second electrode, means connected to said input terminals for applying a positive pulse to said third electrode on the occurrence of an input pulse at either of said terminals, and means connected to said input terminals for increasing the current through said cathode resistances to increase the potential of said cathode by an amount substantially equal to said positive pulse applied to said third electrode on the occurrence of input pulses substantially simultaneously applied to said input terminals whereby an output pulse appears at said anode only on the occurrence of an input pulse at one of said input terminals.

2. An electrical circuit in accordance with claim 1 wherein said means for increasing the current through said resistances comprises a second electron discharge device including a control electrode and a cathode, said first-mentioned and said second-mentioned cathode being electrically connected together, and means for applying a pulse to said control electrode on the occurrence of simultaneous pulses at said input terminals.

3. An electrical circuit in accordance with claim 2 wherein the ratio between said resistances connected to said cathode and said resistance connected to said reference potential is between 1:1.5 and 1:2.

4. An electrical circuit comprising a pair of input leads, a first electron discharge device having a cathode, an anode, and a first, second, and third electrode positioned in that order between said cathode and said anode, a pair of resistors in series between said cathode and a reference potential, said first electrode being connected to the common point between said resistors, means for applying a positive voltage to said anode and said second electrode, means coupled to said input leads and said third electrode for applying a positive pulse to said third electrode on the occurrence of a pulse on either of said input leads, means coupled to said input leads and said cathode for applying a pulse to said cathode on the occurrence of a pulse on both of said input leads, said last-mentioned means including a second electron discharge device having a cathode, control electrode, and anode, said cathodes being connected together, an output lead connected to said control electrode for receiving an output pulse on the occurrence of pulses on both of said input leads, means for applying a positive voltage to said second device anode, and an output lead connected to the anode of said first device for receiving an output pulse on the occurrence of a pulse on only one of said leads.

5. An electrical circuit comprising an Or circuit and an And circuit having a common pair of input leads, an electron discharge device having a cathode, an anode, and a first, second, and third electrode positioned in that order between said cathode and said anode, means for applying a positive potential to said anode and said second electrode, a pair of resistors connected between said cathode and a reference potential, said first electrode being connected to the common point between said resistors, means connecting said Or circuit to said third electrode to apply a positive pulse to said third electrode on the occurrence of a pulse on either of said input leads, means connecting said And circuit to said cathode to increase the current through said cathode resistors to increase the potential of said cathode by an amount substantially equal to said positive pulse applied to said third electrode on the occurrence of pulses on both of said input leads, and means for receiving an output pulse from said anode on the occurrence of a pulse on only one input lead.

6. An electrical circuit in accordance with claim 5 wherein said means connecting said And circuit to said cathode includes a second electron discharge device having a cathode, a control electrode, and an anode, said cathodes being connected together, means for positively biasing said anode of said second discharge device, and means connecting said And circuit to said control electrode, whereby said second device conducts and causes a substantial increase in current through the common cathode resistors on occurrence of pulses on both of said input leads.

7. An electrical circuit in accordance with claim 6 further comprising an output lead connected to said control electrode for receiving an output pulse on the occurrence of pulses on both of said leads.

8. An electrical circuit in accordance with claim 6 wherein the ratio between said resistance connected to said cathode and said resistance connected to said reference potential is between 1:1.5 and 1:2.

References Cited in the file of this patent

UNITED STATES PATENTS

| | | |
|---|---|---|
| 2,499,604 | Neilson | Mar. 7, 1950 |
| 2,573,446 | Ingalls | Oct. 30, 1951 |
| 2,591,088 | Millman et al. | Apr. 1, 1952 |
| 2,609,143 | Stibitz | Sept. 2, 1952 |
| 2,610,790 | Elliott | Sept. 16, 1952 |
| 2,673,293 | Eckert et al. | Mar. 23, 1954 |
| 2,760,062 | Hobbs | Aug. 21, 1956 |

FOREIGN PATENTS

| | | |
|---|---|---|
| 645,628 | Great Britain | Nov. 1, 1950 |
| 1,008,424 | France | Feb. 20, 1952 |
| 1,041,729 | France | June 3, 1953 |

OTHER REFERENCES

Proc. of the IRE, January 1952, "The Binac," by Auerbach et al. (pages 12 to 28), note Fig. 9.